2 Sheets--Sheet 1.

J. M. WHITTEMORE.

Improvement in Breech-Loading Fire-Arms.

No. 5,167. Reissued Nov. 26, 1872.

Witnesses
P. F. Sanborn
Selden Connor

Inventor
James M. Whittemore

AM. PHOTO-LITHOGRAPHIC CO. N.Y. (OSBORNE'S PROCESS.)

2 Sheets--Sheet 2.

J. M. WHITTEMORE.

Improvement in Breech-Loading Fire-Arms.

No. 5,167. Reissued Nov. 26, 1872.

Witnesses

P. F. Sanborn

Silden Connor

Inventor

James M Whittemore

AM. PHOTO-LITHOGRAPHIC CO. N.Y. (OSBORNE'S PROCESS.)

UNITED STATES PATENT OFFICE.

JAMES M. WHITTEMORE, OF AUGUSTA, MAINE.

IMPROVEMENT IN BREECH-LOADING FIRE-ARMS.

Specification forming part of Letters Patent No. 131,921, dated October 1, 1872; reissue No. 5,167, dated November 26, 1872.

*To all whom it may concern:*

Be it known that I, JAMES M. WHITTEMORE, of Augusta, in the county of Kennebec and State of Maine, have invented certain new and useful Improvements in Breech-Loading Fire-Arms; and I do hereby declare the following to be a full, clear, and exact description of the same, reference being had to the accompanying drawing which forms a part of this specification, in which—

Figure 1:
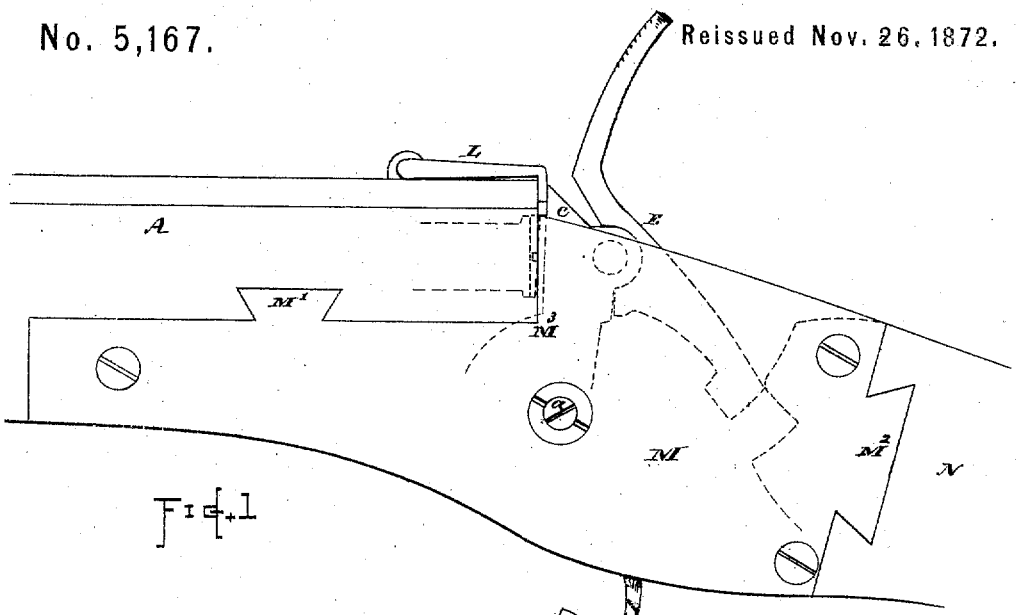
Figure 2:
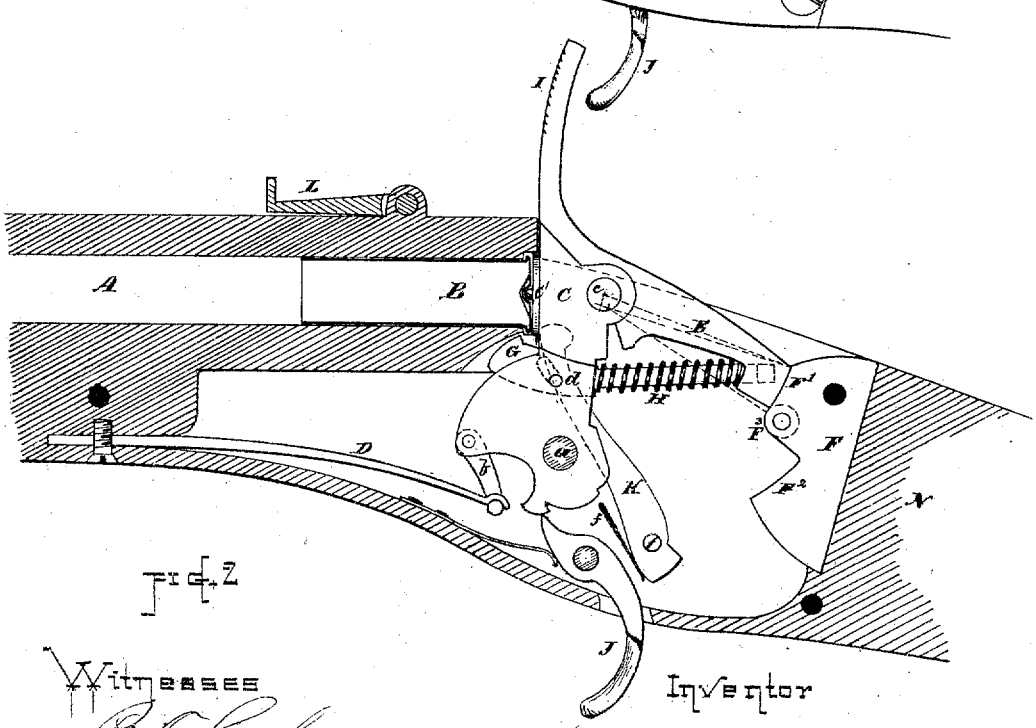
Figure 3:
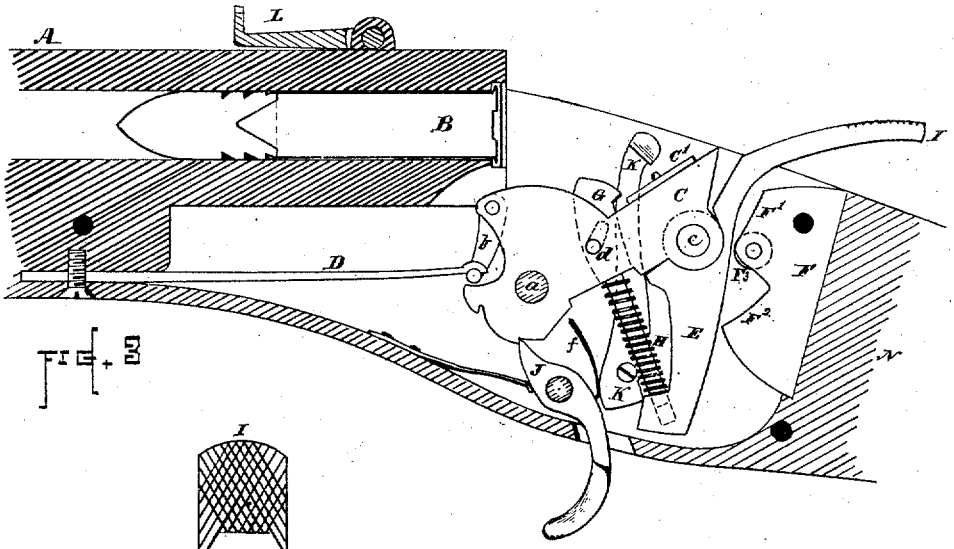
Figure 4:
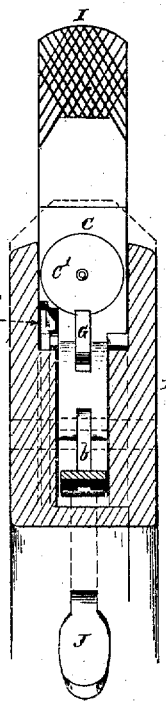
Figure 5:
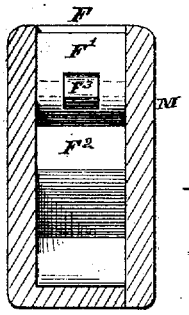

Figure 1 represents a side view of such portions of a breech-loading fire-arm as are necessary to illustrate my present invention; Fig. 2 represents a longitudinal section of a portion of the barrel and stock, and a side view of the various parts of the lock, the hammer being shown up against the rear end of the barrel; Fig. 3 represents a similar view with the hammer thrown back; Fig. 4 represents a transverse section of the piece, showing the face of the discharging-hammer; and Fig. 5 represents a transverse section, showing the face of the recoil-block.

This invention relates to certain improvements in breech-loading fire-arms, where the operation of the fire-arm is rendered more safe and efficient, as will be hereafter explained.

In the drawing, the parts marked A represent the barrel of the piece, the breech or rear end of which is suitably chambered to receive the cartridge B and hammer-face. C indicates the discharging-hammer, which swings upon the spindle *a*, and is operated by the main-spring D, to which its forward projecting portion is joined by a link, *b*, as shown. E indicates the locking-piece, which is hinged to the upper rear part of the hammer C by the spindle *c*, whereby the locking-piece is allowed to move or swing up and down for a short distance independent of the motion of the hammer. F indicates the recoil-block, which receives the backward pressure or recoil of the hammer when the piece is discharged. G indicates the cartridge-shell extractor, arranged through a mortise in the central portion of the hammer, and held therein by a pin, *d*, which passes through a diagonal slot in the extractor, (indicated by dotted lines,) while the rear end of the extractor-spindle is fitted loosely to and supported in an opening formed in the downward-projecting rear end of the locking-piece E. A spring, H, of coiled wire is arranged around the spindle of the extractor, which spring serves to raise the locking-piece E up into place after it has been pressed back. The recoil-block F is made double, or with two bearing-surfaces, $F^1$ $F^2$, so that should the piece be discharged by any accident before the locking-piece was up in proper position, or the locking-piece should by any means be caused to slip from the first bearing $F^1$, the recoil would be borne by the lower bearing $F^2$, and the hammer thereby prevented from swinging back far enough to permit of the cartridge-shell being thrown out to the rear of the piece by such discharge. A roll, $F^3$, is arranged at the corner between the bearing-surfaces of the recoil-block to reduce the friction against the locking-piece as it passes that position. The curves of the bearing-surfaces of the recoil-block F and locking-piece E are such that the locking-piece E will have a firm and sure bearing against the block when placed at any position along said bearing-surface. I have found, by practice and experiments, that the curvature of the face $F^1$ upon the recoil-block F is in many respects preferable, when described from the center, (see dotted lines, Fig. 2,) somewhat below and to the rear of the axis of the spindle *c*, and with a radius less than the distance from the center of said spindle to the rear end of the locking-piece, the rear face of the locking-piece, of course, being formed to correspond with the face $F^1$. By constructing the curvature as above described the locking-piece, practically, has a perfect bearing against the face $F^1$ all the way from its lower edge as it moves up along the said face, and one upon which it is not liable to slip when the recoil takes place, while at the same time there is sufficient play to allow it to move easily up the bearing-surface. The discharging-hammer C is made with a circular face, $C^1$, which, when the hammer is up against the barrel, fits into and closes the aperture of the breech, thus rendering the escape of the gas less liable, while the base of the cartridge is held more secure and firm at the discharge than with an ordinary-faced hammer.

The cartridge is discharged by means of a small projection or point at the center of the circular face. The locking-piece E and recoil-block F firmly resist all pressure applied to the face of the hammer C; but by pressing back the thumb-piece I which projects upward from the hinged portion of the locking-piece, the rear end of the latter is swung downward, the parts being thereby unlocked, and, by further pressure, the hammer may be swung back to full-cock the piece. (See Fig. 3.) When the locking-piece and hammer are moved back the hook of the extractor G catches the rim of the cartridge-shell and withdraws it from the barrel for about one-half of its length, after which the rear end of the locking-piece E, by its further backward movement, is caused to strike the lower end of an ejector, K, pivoted at the side of the lock at *k*, the upper end of which is thereby swung upward and backward, and the cartridge-shell is by the ejector thrown out entirely from the piece; the parts being then in position shown in Fig. 3. When the pressure upon the thumb-piece I is removed the trigger J catches into the rear notch and retains the hammer at its drawn-back position, or at full-cock, while the spring H raises the locking-piece sufficiently to free the ejector K, and the latter is immediately thrown back to its former position, as shown in Fig. 2, by the feather-spring *f*. The new cartridge can then be inserted within the chamber of the barrel, and the piece is ready to be discharged. When the hammer is let up against the cartridge the front end of the extractor G is brought into contact with the rim of the cartridge, which presses back the extractor, and the diagonal slot and pin *b* cause the extractor to move downward sufficiently to allow its hooked end to pass beneath the rim of the cartridge, when the extractor again springs up to place so as to catch the rim when next drawn back. The sight L is constructed so as to be also used as a hammer-guard, and is hinged to the top of the barrel in such a manner that it can be turned forward, as shown in Figs. 2 and 3, and then used as a sight; or it may be turned back, as seen in Fig. 1, so that its end rests between the end of the barrel A and the hammer G, thus preventing the latter from coming into contact with and exploding the cartridge. The sight L may be made so as to be held in any desired position by friction at its hinge, or an adjusting device may be combined with it for retaining it at the proper elevation. The side plate M, which incloses the lock, is made of the form shown in Fig. 1, having dovetailed projections $M^1$ $M^2$, which are fitted to similar-shaped recesses formed in the side of the barrel A and stock N, and with a suitable notch, $M^3$, to embrace the angle of the barrel at its rear end, so that the plate M serves as a support and brace to strengthen the piece at a position which would otherwise be rendered weak, owing to the cavity required for containing the mechanism of the lock. The projections $M^1$ $M^2$ may be made of other than dovetail form, provided the same result is produced. The side plate is secured in position by screws, as indicated.

Having described my improvements in breech-loading fire-arms, what I claim therein as new, and of my invention, and desire to secure by Letters Patent, is—

1. The combination, with the rear of the locking-piece E, of the double recoil-block F, having two bearing-surfaces, $F^1$ $F^2$, substantially as and for the purposes set forth.

2. The combination, with the locking-piece E, hammer C, and barrel A, of the cartridge-shell extractor G, the rear part or end of which is fitted loosely in the lower part of the rear end of the locking-piece, substantially as and for the purposes set forth.

3. The combination, with the extractor G, the rear end of which is fitted loosely in the locking-piece E, provided with the oblong opening or slot near its forward end, of pin *d*, which passes through said opening, as and for the purposes shown and described.

4. The combination, with the locking-piece E, breech-block C, and extractor G, of the ejector K, substantially as shown and described.

5. The combined hammer-guard and sight L, substantially as shown and described.

6. The combination, with the recoil-block F and locking-piece E, of the relieving-roll $F^3$, substantially as and for the purposes set forth.

7. The combination, with the barrel A and stock N, of the lock-plate M, provided with dovetailed projections $M^1$ $M^2$, substantially as and for the purposes set forth.

JAMES M. WHITTEMORE.

Witnesses:

P. F. SANBORN,

SELDEN CONNOR.